UNITED STATES PATENT OFFICE.

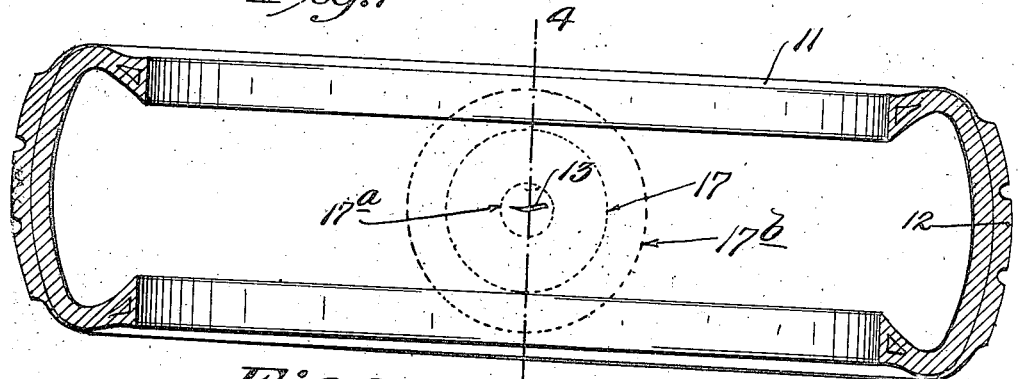
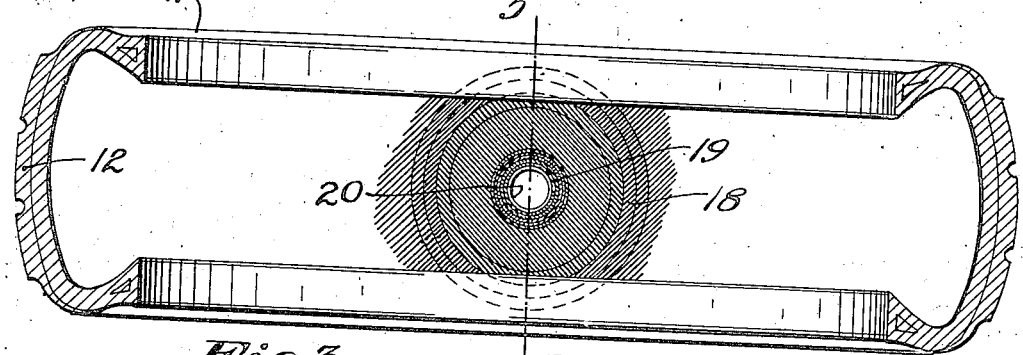
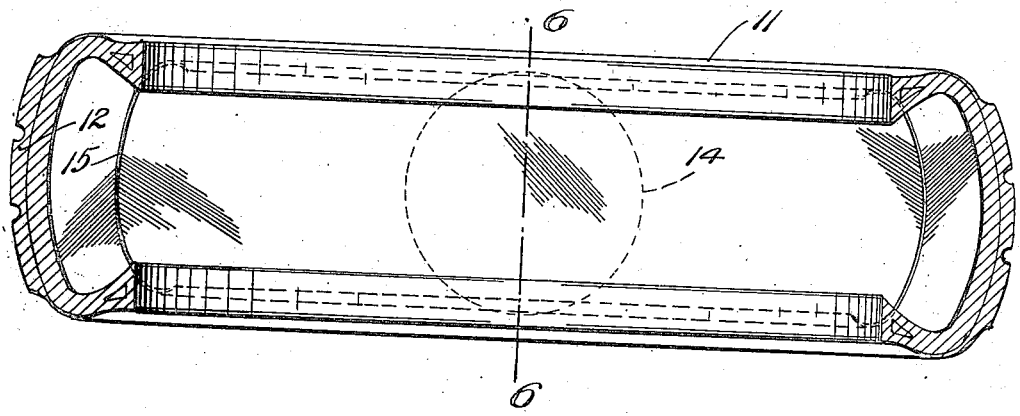

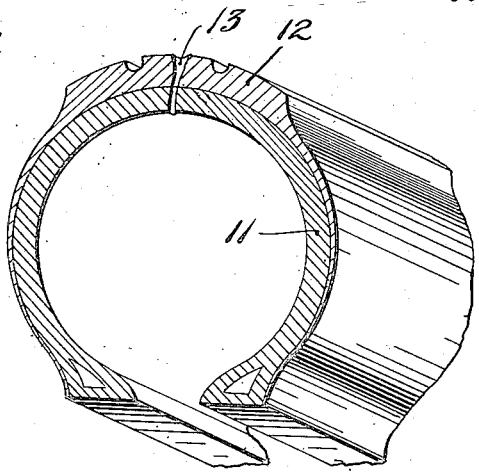
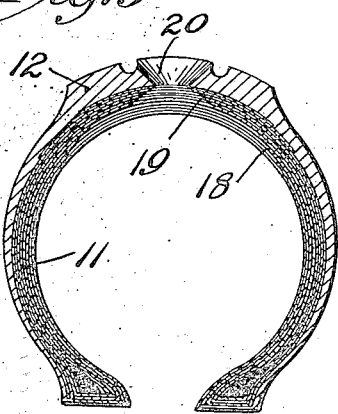
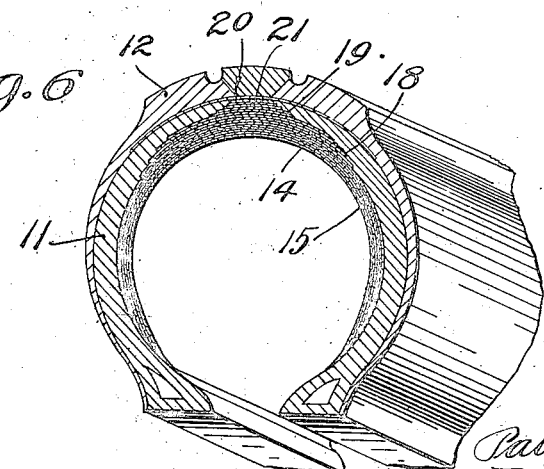

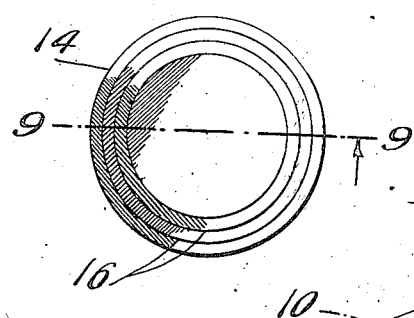
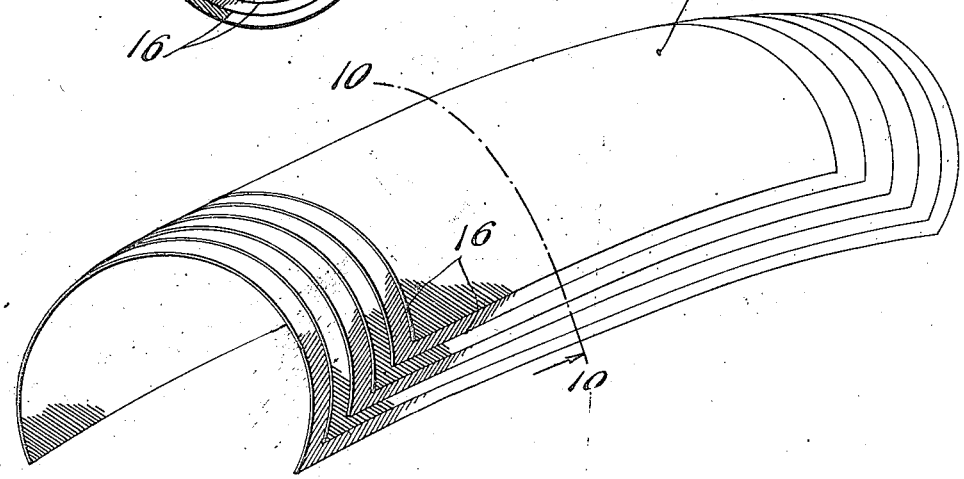
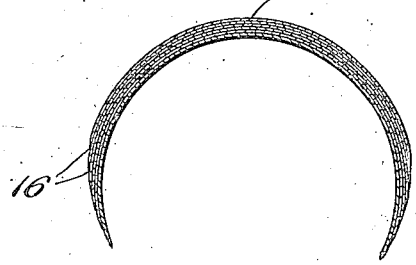

PAUL E. HAWKINSON, OF MINNEAPOLIS, MINNESOTA.

PROCESS OF REPAIRING PNEUMATIC TIRES AND AN IMPROVED PATCH.

Application filed October 21, 1921. Serial No. 509,395.

*To all whom it may concern:*

Be it known that I, PAUL E. HAWKINSON, a citizen of the United States, residing at Minneapolis, in the county of Hennepin and State of Minnesota, have invented certain new and useful Improvements in Processes of Repairing Pneumatic Tires and an Improved Patch; and I do hereby declare the following to be a full, clear, and exact description of the invention, such as will enable others skilled in the art to which it appertains to make and use the same.

My present invention relates to an improved method of repairing pneumatic tire casings having injuries, caused by cuts, blowouts and the like, of such a nature as to require a section to be cut from a casing to remove the injured portion thereof and a new section or patch substituted therefor. The invention provides self-contained fully cured main patches of various different sizes and of the required number of plies to form a complete new casing section to take the place of a defective section cut from a casing. Said invention further provides self-contained fully cured auxiliary patches of various different sizes and of the desired number of plies designed to be cemented to the inner ply of a casing and to a main patch therein and of a greater area than said main patch so as to entirely cover the same and be cemented to the casing around the main patch and completely cover the joint between said main patch and casing.

It is customary, in making certain repairs in pneumatic tire casing requiring new sections, to transversely cut the tread of a casing and strip the ends thereof, from the carcass, circumferentially, for a considerable distance on each side of the injured portion thereof, to permit the necessary repair work to be done on the carcass. The casing side wall rubber must also be stripped from the carcass for a like distance and the chafing strips laid back to the heels of the beads. A polygonal section is then cut from each of the outer plies of the carcass and stripped from the underlying plies, to remove from the carcass, the defective parts. The number of plies from which sections are thus removed depends upon the number of plies in the carcass, usually half of the entire number of plies are thus treated. The defective sections of the several plies, as they are successively removed from the carcass, are made progressively smaller, or in other words, stepped to leave exposed portions of the several plies of the carcass, to receive a coat of cement and afford lap-joints between said plies and a patch to be applied thereto. The balance of the whole in the carcass is then cut out and the exposed surfaces of the several plies are then buffed and coated with cement and the hole in the inner plies closed with raw gum. Polygonal patches of either fabric or cord, depending upon the kind of casing being repaired and to which is applied raw gum, are then fitted, one at a time, in the openings in the plies, formed by removing defective sections therefrom, and of such size as to overlap the exposed portions or surfaces of underlying plies. The outer surface of the carcass from which the tread, side rubber, and chafing strips have been removed, together with the exposed surface of the outer patch are next buffed and coated with cement. The chafing strips, tread and side rubber are then turned back in their regular order onto the carcass and the hole in the tread closed with raw gum. The casing is then placed in a mold and vulcanized in the customary manner.

This process of repairing pneumatic tire casings is very expensive, due principally to the large amount of work required in removing a portion of the tread, side rubber and chafing strips from the carcass to permit said carcass to be repaired. After this expensive work is done, it does not always stand up, and is never satisfactory for the reason that it is impossible to fully repair the damage done to a casing in transversely cutting the tread and stripping a portion thereof from the carcass. The tread is also very liable to loosen from the carcass and applied patch, after it has once been disturbed, and the raw gum, with which the hole in the inner plies is filled, is also liable to loosen and break up. It is also practically impossible to make the corners of a polygonal patch stick and they soon start to work loose, first at their corners from the carcass under the kneeding action of the tire as the same rolls over the road and thereby cause the repair work to disintegrate.

My invention has for its object to overcome these defects in repairing tire casings by providing means and an improved process by which a tire casing to be repaired is not further damaged or weakened in making the repair beyond the original defect. A further object is to provide means and a process by which a repair may be very quickly made, thus eliminating a great deal of time and expense and, at the same time, making a repair that will not only stand up under hard usage of the tire but will last during the life of the casing. A still further object of the invention is to provide a repair that will not take any of the resilience away from a casing or change the original shape thereof.

In the accompanying drawings, which illustrate the invention, like characters indicate like parts throughout the several views;

Referring to the drawings:—

Fig. 1 is a fragmentary view of a pneumatic tire casing looking at the inside thereof, and showing a cut therein, to be repaired;

Fig. 2 is a view corresponding to Fig. 1 after the same has been prepared to receive a patch;

Fig. 3 is a view corresponding to Figs. 1 and 2 showing the tire after being repaired;

Figs. 4, 5 and 6 are views in transverse section taken on the lines 4—4, 5—5 and 6—6 of Figs. 1, 2 and 3, respectively;

Fig. 7 is a bottom view of a four ply main patch.

Fig. 8 is a top view of a six ply auxiliary patch;

Fig. 9 is a transverse section taken on the line 9—9 of Fig. 7; and

Fig. 10 is a transverse section taken on the line 10—10 of Fig. 8.

The numeral 11 indicates the carcass of a pneumatic tire casing and the numeral 12 indicates the tread thereof, and in which carcass and tread is a cut 13.

Figs. 7 and 9 show one of the improved main patches 14 and Figs. 8 and 10 show one of the auxiliary patches 15, the former of which is round and the latter of which is oblong. Each of these patches is self-contained and comprises several plies of either cord or fabric, cemented together at 16 and fully cured. Said plies are made progressively larger, from the top down, in other words, are in stepped arrangement leaving exposed marginal portions of the several plies which are skived to sharp edges.

My improved patch may be either made from new stock, or stock removed from old tires. When the patches are made from new stock, the material will have to be formed so as to curve, both transversely and circumferentially, to fit the casings of the particular sizes for which they are intended, and when the patches are made from old stock, said stock will have the proper curvature. Preferably, as shown, the main patch 14 is round and the auxiliary patch 15 is oblong. As previously stated, these patches are fully cured and have the same characteristics as a casing, at the time they are applied thereto, so that during vulcanization they will not change their shape or position, in respect to the section of the casing to which they are applied. To protect the patches while carried in stock, the same are preferably covered with Holland, or other fabric, not shown, which must, of course, be stripped from the patches just before they are used.

My improved process of repairing a pneumatic tire casing consists, first, in selecting one of the main patches 14 of the proper size and of the desired number of plies to form a complete new section in a casing from which a like defective section is to be removed. The next step is to place a disk-like form 17, of any suitable flexible material, as indicated by broken lines in Fig. 1, and of a slightly larger diameter than the smallest ply of the selected main patch 14, over the cut 13 on the inside of the casing and then mark said casing with a pencil drawn around said form. Preferably, as shown, the form 17 is provided with a central aperture $17^a$ through which the cut 13 may be seen, to assist the operator in centering the form 17, in respect to said cut. A further step is to cut the casing on the pencil line through the same number of plies as the patch 14 and then strip the sections of the casing having the cut 13 therein, from the underlying ply to form an opening 18. The casing is then marked concentric with the first mark $17^a$ to indicate a circle $17^b$ having a diameter slightly larger than the diameter of the largest ply of the main patch 14. The casing is then skived from the circle or mark $17^b$ to the bottom of the opening 18, which exposes marginal portions of the inner plies of the carcass which corresponds, in number, to the number of plies in the patch 14. These concentric exposed surfaces of the several inner plies of the carcass afford lap-joints between the several plies of the patch 14.

The cut 13 in the remaining or outer plies of the carcass, is removed by cutting the casing from within, to form a round hole 19 having walls that taper toward the tread. A similar hole 20 is then cut in the tread 12 on the outer side of the casing to remove therefrom, the cut 13. Next, the entire bottom and side walls of the opening 18, and the side walls of the hole 19, and the inner ply of the casing surrounding the opening 18, are given a coat of cement. After this cement is dry, the hole 19 is filled from within the casing with alternate layers of raw gum and single plies of fabric or cord, as indicated at 21 in Fig. 6. The main patch 14 is then placed in the opening 18 and pressed into position so that it is flush with the inner surface of the casing. Said patch 14, together with the surrounding portions of the inner ply of the casing, is given a coat of cement, and when dry, the auxiliary patch 15 which is of greater area than said main patch, is then applied over the patch 14 and extends for a considerable distance in all directions, onto the inner ply of the casing and covers the joints between the main patch 14 and the casing. After the auxiliary patch 15 is firmly pressed into position, and the hole 20 in the tread 12 filled with raw gum 21, the tire casing is placed in a mold and vulcanized in the customary manner.

The making of this patch, annular, or in other words, without corners, is highly important, as there are no sharp places at which the patch can start to peel from the casing. The resilient movement of the tire casing, as the same travels over a road-bed under a load, will simply travel around the annular edge of the main patch. In actual commercial use, it has been found that a polygonal main patch will soon loosen from the casing and furthermore, the work in preparing a casing to receive a polygonal main patch is very great as it is difficult to correctly form the same. An annular opening with skived edges may be very quickly formed in a casing and a correspondingly formed patch secured thereon.

What I claim is:—

1. An improved process of repairing pneumatic tire casings which consists in cutting a multiple ply section from the inside of the casing to remove a defect therein and form an opening in the casing, the walls of said opening being tapered toward the tread to leave exposed marginal edge portions of the several plies, and in cementing in said opening a fully cured multiple ply patch having correspondingly formed edge portions which overlap said several plies of the casing.

2. An improved process of repairing pneumatic tire casings which consists in cutting a multiple ply section from the inside of a casing to remove a defect therein and form an opening without corners in the casing, the walls of said opening being tapered toward the tread to leave exposed marginal edge portions of the several plies, and in cementing in said opening a fully cured multiple ply patch without corners and having correspondingly formed edge portions which overlap said several plies of the casing.

3. An improved process of repairing pneumatic tire casings which consists in cutting a multiple ply section from the inside of a casing to remove a defect therein and form an opening without corners in the casing, the walls of said opening being tapered toward the tread to leave exposed marginal edge portions of the several plies, in cementing in said opening a fully cured multiple ply patch without corners and having correspondingly formed edge portions which overlap said several plies of the casing, and cementing an auxiliary patch over the main patch and to the inner ply of the casing.

4. An improved process of repairing pneumatic tire casings which consists in cutting a multiple ply section from the inside of a casing to remove a defect therein and form an opening without corners in the casing, the walls of said opening being tapered toward the tread to leave exposed marginal edge portions of the several plies, in cutting the defect from the remaining plies of the casing to form a relatively small hole, the walls of which taper toward the tread, filling said hole with alternate layers of raw gum and patches, in cementing in said opening a fully cured multiple ply patch without corners and having correspondingly formed edge portions which overlap said several plies of the casing, and cementing an auxiliary patch over the main patch and to the inner ply of the casing.

5. An improved process of repairing pneumatic tire casings which consists first in cutting a multiple ply section from the inside of a casing to remove a defect therein and form an opening without corners in the casing, in skiving the several plies of the casing at said opening to sharp edges, and in cementing in said opening a fully cured multiple ply patch without corners, the plies of said patch being skived to sharp edges and overlapping the skived edges of the several plies of the casing at said opening.

6. A pneumatic tire casing patch without corners made up of a plurality of plies vulcanized together and fully cured, said plies having progressively extended marginal portions.

7. A pneumatic tire casing patch without corners made up of a plurality of plies vulcanized together and fully cured, said plies having progressively extended marginal portions that are skived to sharp edges.

8. Main and auxiliary patches for pneumatic tire casings, each made up of a plurality of plies vulcanized together and fully cured, said plies of each patch having progressively extended marginal portions that are skived to sharp edges, said auxiliary patch having a greater area than the main patch and designed to be cemented to said main patch and the surrounding portion of a casing, the plies of the two patches being tapered in the same direction and outward in respect to said casing.

9 In combination with a tire casing having an opening therein, and having skived portions surrounding said opening, whereby to expose successive plies of said casing, a patch composed of a plurality of plies skived to coincide with the skived plies of the casing and in adhesive contact therewith, and a second and larger patch adhesively contacting said first mentioned patch and covering the joints between the contacting plies of the first mentioned patch and the plies of the casing, substantially as described.

In testimony whereof I affix my signature.

PAUL E. HAWKINSON.